United States Patent [19]

Dyroff et al.

[11] Patent Number: 4,587,033

[45] Date of Patent: May 6, 1986

[54] POLYMERIC ACETAL CARBOXYLATE COMPOSITIONS

[75] Inventors: David R. Dyroff, Ladue; Yueting Chou, Chesterfield, both of Mo.

[73] Assignee: Monsanto Company, St. Louis, Mo.

[21] Appl. No.: 627,262

[22] Filed: Jul. 2, 1984

[51] Int. Cl.⁴ .......................... C11D 7/16; C08G 2/30
[52] U.S. Cl. ................................ 524/405; 252/174.13; 252/135; 252/DIG. 2; 525/398; 524/417; 524/424; 524/593
[58] Field of Search ...................... 252/174.24, 174.23, 252/174.13, 135; 528/231; 525/398

[56] References Cited

U.S. PATENT DOCUMENTS

| | | | |
|---|---|---|---|
| 4,140,676 | 2/1979 | Crutchfield et al. | 528/231 |
| 4,144,226 | 3/1979 | Crutchfield et al. | 528/231 |
| 4,146,495 | 3/1979 | Crutchfield et al. | 252/89 R |
| 4,204,052 | 5/1980 | Crutchfield et al. | 525/398 |
| 4,225,685 | 9/1980 | Dyroff et al. | 525/401 |
| 4,315,092 | 2/1982 | Crutchfield | 528/230 |

FOREIGN PATENT DOCUMENTS

| | | | |
|---|---|---|---|
| 1148831 | 6/1983 | Canada | 134/3.30 |
| 15024 | 9/1980 | European Pat. Off. | |
| 2035335 | 6/1980 | United Kingdom | |

*Primary Examiner*—Prince E. Willis
*Attorney, Agent, or Firm*—R. C. Loyer; R. Griesbauer; A. Cole

[57] ABSTRACT

Solid phase compositions having improved storage stability comprising polymeric acetal carboxylates in intimate admixture with a basic additive and a method of producing such admixtures are disclosed. The compositions are useful as builders in detergent formulations.

30 Claims, No Drawings

POLYMERIC ACETAL CARBOXYLATE COMPOSITIONS

This invention relates to polymeric acetal carboxylate compositions useful as complexing agents and detergency builders. More particularly, it relates to said polymers in intimate admixture with a basic additive to provide compositions which are resistant to degradation of the polymer's sequestration properties during storage under warm climate conditions.

BACKGROUND OF THE INVENTION

The property possessed by some materials of improving detergency levels of soaps and synthetic detergents and the use of such materials in detergent compositions is known. Such cleaning boosters are called builders and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds posses useful combinations of builder properties and which compounds do not because of the complex nature of detergency and the countless factors which contribute both to overall performance results and requirements of environmental acceptability.

Sodium tripolyphosphate (STPP) has been found to be a highly efficient cleaning and detergency builder and this compound has been widely used for decades in cleaning formulations. Indeed, millions of pounds of STPP are used each year in cleaning formulations because of its superior builder qualities. However, because of the recent emphasis on removing phosphates from detergent and cleaning compositions for environmental reasons, the detergent and cleaning industry is now looking for materials suitable for use as builders which do not contain phosphorus and which are environmentally acceptable.

Polymeric acetal carboxylates are suitable as a replacement for STPP in detergent compositions. The preparation of such polymeric acetal carboxylates has been disclosed in U.S. Pat. Nos. 4,144,226 issued Mar. 13, 1979 and in 4,204,052 issued May 20, 1980. The use of such polymeric acetal carboxylates in detergent compositions is disclosed in U.S. Pat. No. 4,146,495 issued Mar. 27, 1979. An improved method for the saponification of the esters of the polymeric acetal carboxylates to form the corresponding alkali metal salts is disclosed in U.S. Pat. No. 4,140,676 issued Feb. 20, 1979. An improved method of stabilizing the polymer against rapid depolymerization in alkaline solution by adding an alkyl vinyl ether in the presence of an organo aluminum compound is disclosed in U.S. Pat. No. 4,225,685 issued Sept. 30, 1980. The polymeric acetal carboxylate salts described in the above patents were tested for sequestration function using procedures described by Matzner et al in "Organic Builder Salts as Replacements for Sodium Tripolyphosphate", TENSIDE, 10, No. 3 pages 119-125 (1973). As a result of such tests, polymeric acetal carboxylate salts were found to be superior detergent builders compared to STPP, and were stable under laundry use conditions but depolymerized at lower pH making the polymers more readily biodegradable.

Although the polymeric acetal carboxylates disclosed in the above patents are excellent sequestering agents and builders, it has now been found that these polymeric acetal carboxylates are subject to degradation of their sequestering capacity upon prolonged storage at elevated temperatures such as found in shipping and warehousing conditions in warm climates. It has now been found that solid compositions comprising polymeric acetal carboxylates in intimate admixture with a basic additive are resistant to degradation and retain their sequestering capacity much longer under such storage conditions.

SUMMARY OF THE INVENTION

In accordance with this invention, solid phase compositions of polymeric acetal carboxylates having improved storage stability are provided which comprise a polymeric acetal carboxylate in intimate admixture with a stabilizing amount of a basic additive. Also provided is a process for producing a polymeric acetal carboxylate composition in solid form of improved storage stability which comprises mixing an effective amount of basic additive with a polymeric acetal carboxylate under conditions in which at least one of the components is in the form of a solution or slurry and recovering the admixture in solid form.

The compositions of this invention are resistant to degradation of the polymeric acetal carboxylate at elevated temperatures encountered in shipping and storage of the polymeric aceta carboxylate when exposed in concentrated form as a sequestering agent or detergency builder as well as in the form of finished formulations such as built detergents containing the polymeric acetal carboxylate builders and surfactants.

DETAILED DESCRIPTION OF THE INVENTION

The polymeric acetal carboxylate compound has the following empirical formula:

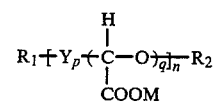

wherein Y is one or more comonomers randomly distributed in the polymer; n averages at least 4; p is 0 to an average of about 5; q is at least 1; $R_1$ and $R_2$ are individually any chemically stable group which stabilizes the polymer against rapid depolymerization in alkaline solution; and M is selected from the group consisting of alkali metal, ammonium, tetralkyl ammonium and alkanol ammonium groups having from 1 to about 4 carbon atoms in the alkyl and alkanol chains.

The preparation and builder properties of these polymeric acetal carboxylates are described in U.S. Pat. Nos. 4,144,226 issued Mar. 13, 1979 to Crutchfield et al and 4,246,495 issued Mar. 27, 1979 to Crutchfield et al, both incorporated herein by reference.

These polymeric acetal carboxylates can be prepared by bringing together in a reaction zone under polymerization conditions an ester of glyoxylic acid, optionally one or more comonomers and a polymerization initiator to form a polymer represented by the empirical formula:

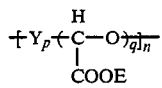

wherein E is an alkyl group having 1 to about 4 carbon atoms and Y, p, q and n are as defined above. The resulting polymer is then reacted at its termini with a reagent which produces a chemically stable end group, $R_1$ and $R_2$, to stabilize the polymer against rapid depolymerization in alkaline solution. The term "rapid depolymerization in alkaline solution", as used herein, means that in an aqueous solution of 0.5 molar sodium hydroxide containing 10 grams per liter of polymeric acetal carboxylate, the average chain length of the polymer will be reduced by more than 50 percent, as determined by Proton Magnetic Resonance, after 1 hour at 20° C. The polymer is then reacted with a base such as lithium hydroxide, sodium hydroxide, potassium hydroxide, and the like to make a salt suitable for use as a builder and as a sequestrant.

A preferred method of stabilizing the polymer against rapid depolymerization in alkaline solution by adding an alkyl vinyl ether in the presence of an organoaluminum compound is described in U.S. Pat. No. 4,225,685 issued Sept. 30, 1980 to Dyroff et al, incorporated herein by reference.

Any number of basic compounds can be used as additives to produce polymeric acetal carboxylate compositions having improved stability in accordance with the present invention. It is preferred that the basic additive be appreciably soluble in water in order to achieve sufficiently intimate mixing with the polymer in an aqueous solution or slurry. The basic additive should have sufficiently high basicity and buffering power to effectively maintain the pH of the polymer admixture (measured as 0.6% aqueous solution) above about 9.5, preferably above about 10.0. However, at effective levels, it should preferably not result in a pH of the polymer composition greater than about 11, since this will make the material significantly more hazardous for use in consumer products such as detergents. It is preferred that the additive have limited solubility in lower alkanol/water mixtures, derived from the saponification of the ester precursor of the polymer, so that the polymer and additive can be efficiently coprecipitated from an aqueous medium in the presence of a sufficient amount of the alkanol. Methanol/water mixtures are particularly preferred since the use of methanol is highly advantageous for recovering the product in the process of producing the polyacetal carboxylate polymer from the preferred methyl ester precursor.

Examples of suitable additives include alkali metal carbonates, alkali metal orthophosphates, alkali metal polyphosphates, alkali metal silicates, alkali metal borates, and the like, including mixtures thereof. Alkali metal carbonates are preferred and sodium carbonate is especially preferred in view of its low cost and appropriate basicity and solubility characteristics. Alkali metal hydroxides are not suitable in most cases because they result in excessively high product basicity at effective levels. Furthermore, if the product is precipitated from a methanol/water solution or the ike, an excessive fraction of the alkali metal hydroxide remains in solution in the liquid phase instead of coprecipitating with the product.

The amount of the basic additive employed to form an intimate admixture with polymeric acetal carboxylates can vary widely with good results and the minimum effective level can be determined for any selected additive by routine experimentation in view of the present description. In the case of sodium carbonate the preferred range is about 1 to 15% by weight based on the weight of the admixture, and the range of 3 to 5% is especially preferred.

The method by which the polymer and the basic additive are mixed can vary widely with good results provided that a sufficient intimate degree of mixing is achieved. Wet mixing is generally effective if one or both of the components have sufficient solubility in the liquid vehicle. Water and aqueous solutions of organic solvents are preferred as the liquid vehicle for mixing the polymer and basic additive. Adequate mixing can be accomplished in a liquid vehicle which totally dissolves the additive and the polymer or in a liquid vehicle which only partially dissolves one or both of the components to form a slurry.

Effective mixing can occur over a wide range of temperatures, mixing times, liquid vehicle composition, orders of addition, degree of agitation, continuous or batch mode of operation, etc. The degree of effectiveness of any particular combination of such parameters can easily be determined by routine experimentation. It is preferred that the pH of the liquid vehicle during mixing be maintained above about 9.5, more preferably above about 10.0. There is no particular advantage in the employment of extremely high pH such as above 11.0, however, such pH when required for other purposes such as saponification of the ester precursor of the polymer is not detrimental in the preparation of the intimate admixture with the basic additive. For example, the basic additive can be effectively introduced by mixing it with the aqueous base used for saponification of the ester precursor.

Once the polymer and the basic additive have been sufficiently admixed, any number of means of converting this mixture to a final solid product can be employed. Where the mixing process has resulted in a homogeneous solution, this solution can be dried via evaporation, it can be added to another material such as methanol to precipitate the contained solids or a material such as methanol can be added to it to produce a precipitate. Where a slurry has been employed to produce the admixture, it may be cooled or further mixed with additional material such as methanol to reduce the solubility of either the polymer or the basic additive to an acceptable level. Once the solubility of each solid in the slurry has been sufficiently reduced, the solids can be separated by any conventional process such as filtration, settling, centrifugation, etc. The resulting moist solids can be washed if desired and dried by any number of methods such as flash-drying, tray drying in an oven or at ambient temperature, rotary drying, etc. The dried solids can be crushed, screened, milled, etc. Such finishing procedures can be used without destroying the stabilizing effect of the basic additive, provided that the polymer and additive remain intimately mixed and the mixture is not subjected to excessive acidic conditions.

In all finishing steps, it is important to avoid excessive acidification of the product. Thus, if recovered solids are washed, it is preferable to employ a wash solution which is sufficiently basic to preserve a solid pH of at least 9.5, preferably 10–11 even at the surface of the solids. Of course, such wash solution must be selected to avoid excessive dissolution and loss of the basic additive. Examples of suitable wash solutions include methanol containing 0.4% by weight of 50% aqueous NaOH, methanol saturated with sodium carbonate, and the like. In drying, excessive contact with acidic combustion gases should be avoided. The tolerable degree of contact with any particular acidic gas mixture during drying can be determined by routine experimentation.

During drying of the admixture product, excessive exposure to high temperatures should be avoided since product degradation can result. Appropriate time and temperature limits for any given method of drying can be determined by routine experimentation. The degree of dryness of the final product can be varied widely. Excessive drying tends to produce a hygroscopic product, while insufficient drying tends to produce a sticky product. A preferred range for final percent volatiles of the solid product is about 8-14% by weight.

The pH of a 0.6% solution of the compositions of this invention can vary over an alkaline range of pH. The preferred pH range is about 9.5 to 11.0 and the range of 10.0 to 10.8 is particularly preferred.

Conditions of preparation of the polymeric acetal carboxylate component of the improved compositions of this invention can vary widely and many of the resulting variations in the polymer can affect its properties. Examples of such variations are different terminal structures at the polymer chain ends, different chain length distributions, different degrees of dryness, different degrees of homogeneity, different contents of various by-products or impurities, different degrees of basicity, different salts of the polymer, etc. While such variations will affect both the storage stability of the polymeric acetal carboxylate and the degree of improvement obtained by using a basic additive in accordance with this invention, in each case the stability of the intimate admixture will be enhanced due to the presence of the basic additive. Polymer component characteristics which result in relatively high hydrolytic stability at a high pH as well as a sufficiently high rate of hydrolysis in waste water at lower pH to satisfy environmental concerns under use conditions are preferred.

Preferred compositions having improved stability are particulate compositions which comprise an effective amount of a basic additive in intimate admixture with a stabilized water-soluble polymer comprising polyacetal carboxylate segments represented by the structure

wherein M is selected from the group consisting of alkali metal, ammonium, tetraalkyl ammonium, and alkanol ammonium groups having from 1 to about 4 carbon atoms in the alkyl and alkanol chains; n averages at least 4, and the polyacetal carboxylate segments comprise at least 50% by weight of the total polymer.

Particularly preferred compositions of this invention are particulate compositions which comprise an effective amount of the basic additive in intimate admixture with a polyacetal carboxylate having the structure

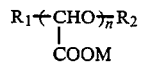

wherein M is sodium or potassium; n averages at least 4 (preferably 50 to 150); $R_1$ and $R_2$ are individually any chemically stable group which stablizes the poyacetal carboxylate against rapid depolymerization tion in alkaline solution; and the polyacetal carboxylate segments comprise at least 50% by weight of the total polymer. Preferably, at least one of $R_1$ and $R_2$ is derived from ethyl vinyl ether.

The polymeric acetal carboxylate admixtures of this invention are particularly useful as detergency builders in detergent formulations such as described in U.S. Pat. No. 4,146,495 issued Mar. 27, 1979 to Crutchfield et al, and Canadian Pat. No. 1,148,831 issued June 28, 1983 to Rodriguez et al, both incorporated herein by reference.

The degradation of a polymeric acetal carboxylate under conditions of elevated temperatures occurring during shipping and storage in warm climates was evaluated using the following procedure.

A 0.6 gram sample of the product was stored in a tightly closed 4 ounce glass bottle and maintained at 49° C. for a period of 2-6 weeks. The amount of final sequestration activity or polymer content of the product was determined at the end of the exposure period. For the most accurate determination of storage stability, an exposure time of 4-6 weeks is preferred. The sequestration activity or polymer content of the product can be determined by measurement of its calcium sequestration capacity or by measurement of its polymer content by means of high performance liquid chromatography. Similar results are obtained by either method. The calcium sequestration method requires less elaborate equipment and the following method can be used with good results.

A sample of the product is dissolved in deionized water to form a solution slightly more concentrated than 0.6% by weight, adjusted to pH 10.0 with 1 normal NaOH or HCl, and diluted to exactly 0.600% with deionized water. A portion of this solution is charged to the reservoir of an automatic titrator equipped with a calcium selective electrode. Exactly 100 mls of $10^{-3}M$ $CaCl_2$ solution, adjusted to pH 10.0 with 1 normal NaOH, is titrated with the sample solution with stirring at a titrant feed rate of 2 ml/minute. Titration is continued until well past the equivalence point of a titration curve on the recorder chart of the titrator, usually 10 ml or less of titrant. The titration is repeated using a sample of standard sodium tripolyphosphate (STPP) in place of the product sample. For each of the two titrations, the equivalence point is determined graphically, and the number of ml of titrant required to reach the equivalence point is measured. The calcium sequestration activity of the product sample is then calculated as follows:

$$\% \text{ of STPP} = \frac{\text{ml STPP solution to equiv. pt.}}{\text{ml product solution to equiv. pt.}} \times 100$$

The initial activity was determined for an otherwise identical sample which had not been exposed to aging at 49° C. The percentage loss of activity per week of exposure was then calculated as follows:

$$L = \frac{A_i - A_f}{A_i} \times \frac{100\%}{N}$$

where:
$A_i$ is the initial activity
$A_f$ is the final activity
N is the number of weeks exposure L is the rate of activity loss (% per week).

The improved compositions of this invention, when tested for stability as described above, lose calcium sequestration capacity at a rate not exceeding about 5% per week. In the most preferred embodiments of this invention the rate of loss of calcium sequestration capacity does not exceed about 2% per week. The percentages referred to are percentages of the initial calcium sequestration capacity of the product. Thus, a loss of 100% represents total loss of the original calcium sequestration capacity.

The invention is further illustrated by, but not limited to, the following Examples wherein all parts and percentages are by weight, unless otherwise indicated.

EXAMPLE 1

This Example illustrates the degradation of the sequestration activity of the polymeric acetal carboxylates in the absence of a basic additive.

A batch of polymeric acetal carboxylate sodium salt having an average structure

with chain ends stabilized by addition of ethyl vinyl ether was prepared generally as taught by U.S. Pat. No. 4,225,685. Freshly distilled methyl glyoxylate in methylene chloride is polymerized using triethyl amine initiator to form the ester polymer which is endcapped using ethyl vinyl ether in the presence of an organoaluminum endcapping catalyst and saponified with excess sodium hydroxide. The polymer product is precipitated using methanol and filtered and dried. The pH of the product was about 9.9 and the initial calcium sequestration capacity was 143% of STPP. Two samples of this material were evaluated using the above described procedure to determine storage stability. One sample was exposed for two weeks and its average rate of calcium sequestration activity loss was about 15% per week and the other sample was exposed for five weeks and its activity loss averaged 20% per week.

EXAMPLE 2

This Example illustrates the degradation of sequestration activity of the polymeric acetal carboxylates when mixed with the basic additive by dry mixing.

A sample of the polymeric acetal carboxylate of Example 1 in powder form and dry sodium carbonate powder were mixed and vigorously shaken in a closed glass vessel for thirty minutes to produce a uniform product containing 5.0% sodium carbonate. The pH of a 0.6% aqueous solution of the product was 10.10. A sample of this material was evaluated for storage stability as above. The average rate of calcium sequestration activity loss was about 19.5% per week demonstrating that the basic additive is not effective when mixed with the polymer in the dry state.

The following Examples illustrate the unexpected advantages of the present invention.

EXAMPLE 3

This Example illustrates the preparation of an intimate admixture of the polymer and basic additive by mixing the additive with the aqueous base used for saponification of the ester precursor.

A batch of polymeric acetal carboxylate was prepared as described in Example 1 except sodium carbonate was added to the aqueous sodium hydroxide used to saponify the polymeric ester and the methanol generated by the saponification reaction was sufficient to complete the precipitation of the polymer product. The polymer product was filtered and dried. The pH of a 0.6% aqueous solution of the product was 10.01. The recovered product contained 3.0% sodium carbonate. A sample of this admixture was evaluated for storage stability as above. The average rate of calcium sequestration activity loss was about 1.4% per week.

EXAMPLE 4

Another batch of polymeric acetal carboxylate was prepared using the procedure of Example 3. The recovered product contained 2.92% sodium carbonate and a 0.6% aqueous solution of this admixture had a pH of 10.22. The average rate of calcium sequestration activity loss was about 0.35% per week.

EXAMPLE 5

This Example illustrates the preparation of an intimate admixture by mixing the basic additive and polymeric acetal carboxylate in solution.

A batch of polymeric acetal carboxylate salt was prepared as described in Example 1. Sodium carbonate was added to the polymer dissolved in hot water. The solution of the product was then evaporated to dryness and milled to produce in particulate form an intimate admixture of the polymer containing 3.1% sodium carbonate. This admixture was evaluated for storage stability as above. The average rate of calcium sequestration activity loss was about 4.0% per week.

EXAMPLE 6

This Example illustrates the effectiveness of several different basic additives in the preparation of the intimate admixtures of the invention.

A batch of polymeric acetal carboxylate salt was prepared as described in Example 1 and the resulting product had an average structure

with chain ends stabilized by addition of ethyl vinyl ether. One sample of this material, in dry powder form, was used as a control for stability testing. Other samples were prepared by mixing 30 parts of the material with a solution containing 1.5 parts NaOH, 9.0 parts $CH_3OH$ and 56.5 parts $H_2O$, adding a basic additive to the slurry and stirring the mixture for one hour at 55° C. The mixture was cooled to 45° C. and more methanol was added to complete the precipitation of the product. The solids were recovered by filtration and drying, and the product was evaluated for storage stability as described previously. Results are presented in the following table.

| Basic Additive | % of Product | Product pH | % Act. Loss/Wk. |
|---|---|---|---|
| None | 0 | 9.66 | 22.2 |
| $Na_2CO_3$ | 3.2 | 10.05 | 1.77 |
| $Na_2B_2O_4$ | 3.0 | 9.97 | 0.31 |
| $Na_2SiO_3$ | 7.1 | 10.30 | 0.79 |
| $Na_3PO_4$ | 4.2 | 10.34 | 1.22 |
| $Na_5P_3O_{10}$ | 4.3 | 10.17 | 0.93 |

What is claimed is:

1. A composition in solid form consisting essentially of a polymeric acetal carboxylate in intimate admixture with a stabilizing amount of a basic additive, said additive having sufficient basicity and buffering power to maintain the pH of the composition above about 9.5.

2. The composition of claim 1 wherein the polymeric acetal carboxylate has the empirical formula:

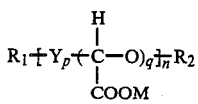

wherein Y is one or more comonomers randomly distributed in the polymer; n averages at least 4; p is 0 to an average of about 5; q is at least 1; $R_1$ and $R_2$ are individually any chemically stable group which stabilizes the polymer against rapid depolymerization in alkaline solution; and M is selected from the group consisting of alkali metal, ammonium, tetralkyl ammonium and alkanol ammonium groups having from 1 to about 4 carbon atoms in the alkyl and alkanol chains.

3. The composition of claim 2 wherein p is 0, q is 1 and M is alkali metal.

4. The composition of claim 3 wherein the basic additive is selected from the group consisting of alkali metal carbonates, alkali metal orthophosphates, alkali metal polyphosphates, alkali metal silicates, alkali metal borates and mixtures thereof.

5. The composition of claim 3 wherein the basic additive is alkali metal carbonate.

6. The composition of claim 4 wherein at least one of $R_1$ and $R_2$ is derived from ethyl vinyl ether.

7. The composition of claim 6 wherein n averages in the range of 20 to 200.

8. The composition of claim 7 wherein the basic additive is sodium carbonate.

9. The composition of claim 8 wherein M is sodium and n averages in the range of 50 to 150.

10. The composition of claim 8 wherein the sodium carbonate is about 1 to about 15% by weight of the admixture.

11. A particulate composition having improved storage stability consisting essentially of an effective amount of a basic additive having sufficient basicity and buffering power to maintain the pH of the composition above about 9.5 in intimate admixture with a stabilized water-soluble polymer comprising polyacetal carboxylate segments having the structure

wherein M is selected from the group consisting of alkali metal, ammonium, tetralkyl ammonium and alkanol ammonium groups having from 1 to about 4 carbon atoms in the alkyl and alkanol chains; n averages at least 4, and the polyacetal carboxylate segments comprise at least 50% by weight of the total polymer, said admixture having an average rate of activity loss not exceeding about 5% per week at 49° C.

12. The composition of claim 11 wherein the basic additive in intimate admixture with the polymer provides an admixture such that a 0.6% aqueous solution of the admixture has a pH in the range of about 9.5 to about 11.0.

13. The composition of claim 11 wherein M is alkali metal.

14. The composition of claim 13 wherein the basic additive is selected from the group consisting of alkali metal carbonates, alkali metal orthophosphates, alkali metal carbonates, alkali metal silicates, alkali metal borates and mixtures thereof.

15. The composition of claim 14 wherein the alkali metal of the basic additive is sodium and the composition comprises at least 90% by weight of the admixture.

16. The composition of claim 14 wherein the polymer is a water-soluble polyacetal carboxylate having the structure

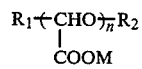

wherein M is sodium or potassium; n averages at least 4; $R_1$ and $R_2$ are individually any chemically stable group which stabilizes the polyacetal carboxylate against rapid depolymerization in alkaline solution; and the polyacetal carboxylate segments comprise at least 50% by weight of the total polymer.

17. The composition of claim 16 wherein n averages from about 50 to about 150.

18. The composition of claim 17 wherein M is sodium and at least one of $R_1$ and $R_2$ is derived from ethyl vinyl ether.

19. The composition of claim 18 wherein the basic additive is sodium carbonate.

20. The composition of claim 18 wherein the amount of the basic additive is from about 1% to about 15% by weight of the admixture and the composition comprises at least 90% by weight of the admixture.

21. The composition of claim 18 wherein the amount of the basic additive is from about 3% to about 5% by weight.

22. A process for producing a composition having improved thermal stability consisting essentially of a polymeric acetal carboxylate and a thermally stabilizing amount of a basic additive which comprises mixing an effective amount of a basic additive with the polymeric acetal carboxylate under conditions in which at least one of the basic additive and the polymeric acetal carboxylate is in the form of a solution or slurry and recovering an intimate admixture of the additive and the polymeric carboxylate in solid form, said additive having sufficient basicity and buffering power to maintian the pH of the composition above about 9.5.

23. The process of claim 22 wherein the polymeric acetal carboxylate has the empirical formula:

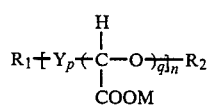

wherein Y is one or more comonomers randomly distributed in the polymer; n averages at least 4; p is 0 to an average of about 5; q is at least 1; $R_1$ and $R_2$ are individually any chemically stable group which stabilizes the polymer against rapid depolymerization in alkaline solution; and M is selected from the group consisting of alkali metal, ammonium, tetralkyl ammonium and alkanol ammonium groups having from 1 to about 4 carbon atoms in the alkyl and alkanol chains.

24. The process of claim 23 wherein the basic additive is selected from the group consisting of alkali metal carbonates, alkali metal orthophosphates, alkali metal polyphosphates, alkali metal silicates, alkali metal borates and mixtures thereof.

25. The process of claim 24 wherein p is 0; q is 1; M is sodium and n averages in the range of about 50 to about 150.

26. The process of claim 25 wherein at least one of $R_1$ and $R_2$ is derived from ethyl vinyl ether.

27. The process of claim 25 wherein the basic additive is alkali metal carbonate.

28. The process of claim 25 wherein a solution of the basic additive is mixed with the polymeric acetal carboxylate.

29. The process of claim 26 wherein the basic additive is sodium carbonate.

30. The process of claim 26 wherein sodium carbonate is mixed with a slurry of the polymeric acetal carboxylate in a methanol/water mixture.

* * * * *